US007954710B1

(12) United States Patent
Lee

(10) Patent No.: US 7,954,710 B1
(45) Date of Patent: Jun. 7, 2011

(54) SYSTEM AND METHOD FOR ORDERING USING BARCODE DATA COLLECTOR AND ONLINE SERVICES

(75) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 217 days.

(21) Appl. No.: 12/383,978

(22) Filed: Mar. 31, 2009

(51) Int. Cl.
*G06K 15/00* (2006.01)

(52) U.S. Cl. ......................... 235/383; 235/375; 235/385

(58) Field of Classification Search .................. 235/383, 235/375, 487, 381, 382, 385; 705/26
See application file for complete search history.

(56) References Cited

U.S. PATENT DOCUMENTS

| | | | | |
|---|---|---|---|---|
| 6,015,167 | A * | 1/2000 | Savino et al. | 283/67 |
| 6,308,893 | B1 | 10/2001 | Waxelbaum et al. | |
| 2002/0161745 | A1 * | 10/2002 | Call | 707/1 |
| 2003/0050854 | A1 * | 3/2003 | Showghi et al. | 705/26 |

* cited by examiner

*Primary Examiner* — Edwyn Labaze
(74) *Attorney, Agent, or Firm* — Gorman Law Offices

(57) ABSTRACT

The present invention allows a user to place an order on an internal computer system or through a web site automatically by scanning UPC/EAN or product ID barcodes, without the need to modify supplier or other party websites. As such, a compact optical code reader with associated software is disclosed having multiple functions and is capable of performing various data processing functions involving scanned data. The system includes user and supplier identifiers which are employed to facilitate sales transactions.

8 Claims, 2 Drawing Sheets

SYSTEM AND METHOD FOR ORDERING USING BARCODE DATA COLLECTOR AND ONLINE SERVICES

FIELD OF THE INVENTION

The present invention relates to a system and method for electro-optically scanning symbols, for example, bar code or matrix array symbols such as UPC/EAN codes, and the automated processing of said scanned data in such a way as to facilitate business transactions and the exchange of information over networks. Through the use of the inventive ordering system and method, an improved code reader and associated methods are described herein that allows a user to placing an order on an internal computer system and/or through to existing online web sites automatically by scanning UPC/EAN or other product barcodes/product identifiers without the need for additional user manual operation, and without the need for specialized website structures or other modifications.

BACKGROUND AND OBJECTS

Web based ordering systems are increasingly becoming popular among Business to Business settings, as well as in Business to Consumer transactions. Gradually, bar code readers have become more prevalent in this context. To this end, different code readers or scanners are known in the prior art for reading various symbols such as bar code symbols appearing on a label or on the surfaces of an article. Essentially, a bar code symbol is a coded pattern of indicia comprised of a series of bars of various widths spaced apart from one another to bound spaces of various widths, the bars and spaces having different light reflecting characteristics. Readers for scanning or imaging systems electro-optically transform the graphic indicia into electrical signals, which are decoded into information, typically descriptive of the article or some characteristic thereof. When scanned, such characteristics are conventionally represented in digital form and are typically used as inputs for a data processing system for applications in point-of-sale processing, inventory control and the like. Scanning systems of this general type have been disclosed, for example, in U.S. Pat. No. 6,308,893, the specification of which is hereby incorporated by reference in its entirety. However, this type of electronic commerce and electronic exchange of such data still means that the entering of orders is done manually by having a user entering key indicia such as UPC/EAN code, product code or product name. This is not only very time consuming, but it often means it is a task that is fraught with errors. As such, known systems suffer from these deficiencies and more.

SUMMARY OF THE INVENTION

Given the aforementioned drawbacks in known systems, it is therefore an object of the present invention to provide a novel approach for exploiting optical code readers to facilitate business transactions and information exchanges while efficiently and accurately ensuring the transmission of these indicia over networks in a convenient, automated fashion.

These and other objects and features will be apparent from the following summary and from the below description of the inventive system and method. At its broadest level, the present invention comprises a method for ordering products through the use of a system including bar code readers comprising the steps of providing bar code readers having associated therewith at least one reader identifier; using the bar code reader to read an optical code on a given product that contains an identifier that conveys standardized product description; inputting a quantity of said given product; establishing communication between the bar code reader and a terminal linked to the Internet; accessing, through the terminal, a web site of a supplier using supplier identifier indicia obtained from the optical code and associating a reader identifier with the access; automatically supplying, to the web site of a supplier, data relating to the given product, including at least the standardized product description and the quantity; automatically supplying, to the web site of a supplier, data relating to the reader identifier; and processing order fulfillment related data received from the supplier based upon access to the web site of said supplier that has been accessed with the reader identifier. In addition, the present invention further comprises having an Ordering Agent program is loaded onto the terminal, and wherein the Ordering Agent program, will further prompt a user to enter an order web site-specific user ID and password, the web site user ID and password thereafter being stored in a local database on said terminal. Also, the Ordering Agent may periodically retrieve items pertaining to order web site-specific user ID and will call a web service running on the web site of a supplier in such a way as to order web site-specific user ID and password as arguments to the web service, and where the Ordering Agent will receive a validation response from the web service running on the web site of a supplier, and where validation has been indicated by the validation response, and thereafter, the Ordering Agent will receive the fulfillment related data and will create at least item codes, descriptions and barcode data on the local database on the terminal. Thereafter, the bar code reader can establish a connection with the terminal, such that the Ordering Agent will transfer the fulfillment related data and any item codes, descriptions and barcode data stored on the local database on the terminal to the bar code reader either manually or automatically. In addition, the bar code reader can read the optical code on a given product that contains an identifier in such a way that conveys standardized product description, and so that a user may read the product description and will confirm or modify an order. The Ordering Agent may further load the data relating to the given product, including at least said standardized product description and the quantity and will store the data relating to the given product, including at least the standardized product description and the quantity in said local database on the terminal. Lastly, the Ordering Agent may further launch a web site of the supplier in such a way as to utilize a new browser window and so as to provide the web site of the supplier any data relating to the user ID, the password, the item codes, and the quantity in a URL so as to be input to a shopping cart screen.

The inventive system therefore includes a hand held code reader and inventive methodology with software for automated data collection that may be part of a portable data collection system. The hand held reader may be a battery operated or other type of mobile unit for acquiring and storing data. Data (such as system, customer and supplier identifiers, as well as product and service information derived from code reading) may be stored in the reader's memory. An optional host terminal with superior data access, and computational and display capabilities may be used in conjunction with the code reader in order to enhance system versatility and performance. An optional docking station may provide an interface with the host terminal, and may include a cradle adapted to receive and secure the mobile, handheld reader.

One illustrative embodiment of the present invention includes a system including bar code readers and a terminal linked to the Internet or other network. According to this method, bar code readers are provided having associated identifiers stored in memory. The identifiers may identify the user of the bar code reader and/or a vendor who is to be compensated for providing the goods or services ordered through the bar code reader (if the data collection is purchase related), or alternatively, may simply reflect a present or standing inventory compilation for internal network purposes. The bar code reader is used to read bar codes that contain may contain an identifier of a supplier/purveyor of information, products, or services of interest. Communication may be established between the bar code reader and the terminal linked to an internal ordering or inventory system, and/or to the Internet. A web site of the supplier (or other entity) may be accessed using either web browsers accessing a particular vendors' site, or alternatively, the supplier may even be identified from the bar code or other indicia that can automate access to an Ordering Website.

In line with the above, communication may also be established between the bar code reader and the terminal linked to the internal ordering system or Internet web site by docking the bar code reader in a docking station whereby the docking station is associated with a computer terminal and is capable of downloading and/or uploading data stored by the code reader including any needed particulars, such as the user identifier, vendor identifiers, product identifiers, etc. Alternatively, such linkage may be accomplished through wireless connectivity such as Bluetooth or WiFi between the handheld unit and a user terminal or computer. The automated association of the reader identifier with access to the web site of the supplier may be accomplished by setting a cookie in the computer terminal which associates the reader identifier with each access of the supplier's web site made from the computer terminal.

In one embodiment, the user computer terminal may therefore be a central computer terminal associated with the system, or in an another embodiment, the computer terminal may be a personal computer of an user who scans the bar code of the supplier or product. To that end, the present invention may also include methods by which the bar code reader system may be used to identify either a single or multiple potential sellers of a product or service. In such a system, the computer terminal or enhanced code reader may be used to transmit an inquiry over the Internet or other network to multiple potential sellers (or internal inventory repositories) identified, so that the user may receive sales offers from one or more such vendors, or may simply log present inventory within a given institutional system if the application is internally focused. If needed, the system may also be used to transmit an acceptance response to one of said sales offers, as applicable. Payment may be provided to the successful seller using a payment identifier transmitted by the terminal according to either traditional billing approaches, or through known online payment systems.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may necessarily not be set forth below, but may instead be appreciated by one skilled in the art.

DETAILED DESCRIPTION

Figure 1:
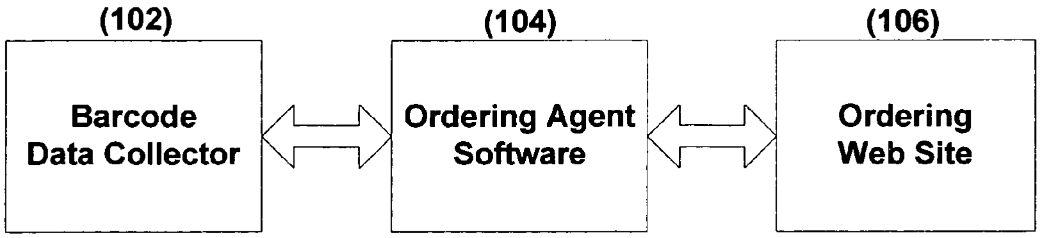
FIG. 1 is a system level view of an optical bar code reader interfacing with an external Ordering Website in accordance with one embodiment of the present invention.

In order to employ the inventive system and method, one embodiment involves a user employing a hand held, portable laser scanning device held by a user, which is configured to allow the user to aim the device, and more particularly, a light beam, at a targeted symbol to be read. The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot at the target distance be approximately the same as the minimum width between regions of different light reflectivity, i.e., the bars and spaces of the symbol. In the laser beam scanning systems known in the art, the laser light beam is directed by a lens or other optical components along the light path toward a target that includes a bar code symbol on the surface. The moving-beam scanner operates by repetitively scanning the light beam in a line, pattern or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or both.

Bar code reading systems also include a sensor or photo detector which detects light reflected or scattered from the symbol. The photo detector or sensor is positioned in the scanner in an optical path so that it has a field of view which ensures the capture of a portion of the light which is reflected or scattered off the symbol. This light is detected and converted into an electrical signal. Electronic circuitry and software decode the electrical signal into a digital representation of the data represented by the symbol that has been scanned. For example, the analog electrical signal generated by the photo detector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the information or alphanumeric characters so represented.

The decoding process of a given bar code reading system may work in the following way. The decoder receives the pulse width modulated digitized signal from the digitizer, and an algorithm, implemented in the software, attempts to decode the signal. If the start and stop characters and information between them in the scan were decoded successfully, the decoding process terminates and an indicator of a successful read (such as a green light and/or an audible beep) is provided to the user. Otherwise, the decoder receives the next scan, performs another decode attempt on that scan, and so on, until a satisfactorily decoded scan is achieved or no more scans are available. Signals may then be decoded according to the specific symbology into a binary representation of the data encoded in the symbol, and to the information or alphanumeric characters so represented. The transmission of data to an affiliated user terminal or computer may be accomplished through wired, or wireless means, such as through WiFi/ZigBee, etc. based systems, or even through (or to) cellular phones and PDAs. Alternatively, the system may also provide for a communication connector socket at the rear end of the device into which a plug may be inserted. The plug and socket may be used to electronically transfer the inventively collected optical code data to a personal computer or other suitable data handling terminal. The decoded information may thereafter be stored or subjected to data processing.

Moving-beam laser scanners are not the only type of optical instrument capable of reading bar code symbols. Another type of bar code reader is one which incorporates detectors based on solid state imaging arrays or charge coupled device (CCD) technology. In such prior art readers the detector is typically smaller than the symbol to be read. Accordingly, image reduction is performed by an objective lens in front of the array or CCD. The symbol may be illuminated with light from a light source such as light emitting diodes (LED) in the scanning device, and each array cell is sequentially read out to determine the presence of a bar or a space.

It will be understood that many aspects of the present invention described below may be adapted for use in this, as well as other for handheld or stationary optical code readers. To that end, FIG. 1 depicts the ordering system consists generally of: (1) a bar code reader, also termed a Barcode Data Collector ("BDC") (102) having a display; (2) a client Ordering Agent software (104); (3) a Ordering Website (106). As can be seen by the representative elements above, the broadest functionality of the inventive methodology employed in any given BDC may be described as follows: (i) Storing product information into barcode reader; (ii) Displaying various product description data (although in some embodiments this need not include barcode data itself or operations such as quantity adjustment, order delete, etc.) that is stored locally; (iii) Uploading collected order information and composing orders to a vendor website automatically (or detailing inventory internally), without user manual operation; and (iv) Providing for all of the above services within existing web based ordering systems, without changing existing web program.

Figure 2:
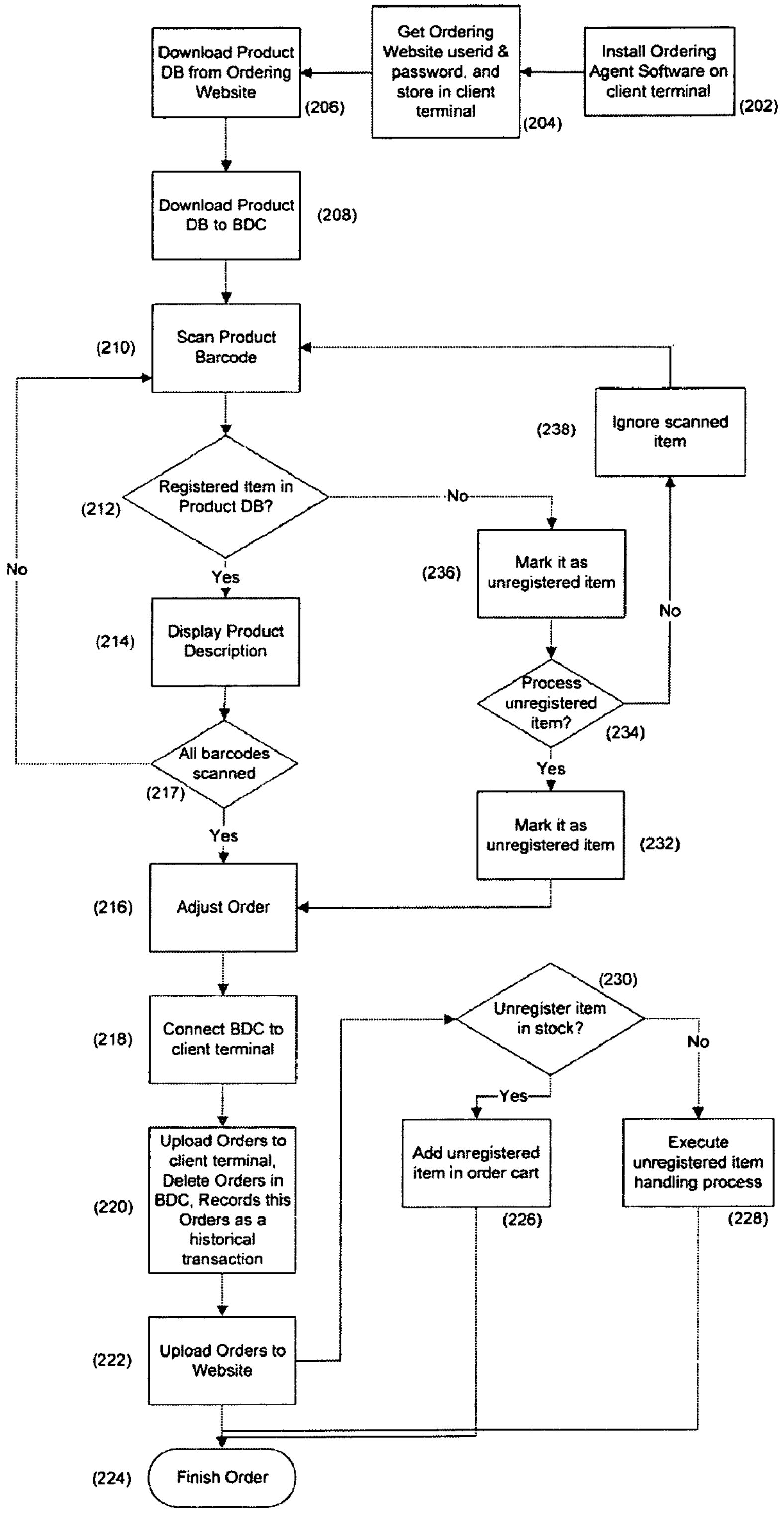
FIG. 2 is a flow diagram of an inventive method for using a bar code reader within the system described in FIG. 1.

With reference to FIG. 2, the code reader (not depicted) is associated with a terminal that contains code segments of downloaded software (Ordering Agent Software) therein that represent the inventive steps that provide for the automated ordering (or inventory) of target products without the need for the revision of any receiving party systems or websites (such as an illustrative vender Ordering Website 106). In order to seamlessly collect the proper data for transfer by the user computer to say, a vendor's website for purchasing, FIG. 2 describes one general description of the inventive approach. Specifically, this ordering system works in the following illustrative sequence: (1) User will install the Ordering Agent program on a client terminal 102/104 with Internet connectivity at step 202; (2) When the Ordering Agent 104 program is run, it will prompt user to enter their order web site user id and password. Ordering Agent 104 will store this information in its local database on the client terminal at step 204; (3) Ordering Agent 104 will periodically retrieve all the items pertaining to the user ID, which will call a web service running on an Ordering Website for this purpose at step 206, and will pass the user ID and password as arguments to the web service; (4) Ordering Web service 106 will validate the user ID and password, and if these values are invalid then an error message can be sent in response, but if the values are valid, then the Ordering Website will find all the items that the user can access, and will then send the item codes, descriptions and corresponding barcode data of those items in the response to the Ordering Agent 104 at step 208; (5) Ordering Agent 104 will create local product Database (DB) consists of item codes, descriptions and barcode data at step 210; (6) When a BDC gets connected to the client terminal, Ordering Agent 104 will transfer the product DB to the BDC either, manually or automatically at step 212; (7) User scans a product barcode and BDC displays corresponding product description, and thereafter User reads product description and confirm or modify (delete, adjust quantity) order at step 214; (8) Ordering Agent 104 will download all the scanned barcode data from the BDC and store them to the client terminal local database at step 216; (9) Ordering Agent 104 will launch the Ordering Website in the new browser window, and this will include the user ID, password, item codes, and quantities in the URL at step 216; (10) Ordering Agent 104 will delete scanned items from the BDC as soon as the website is launched at step 218, and where the website cannot be opened because of Internet connectivity issues, user will be able to retrieve the scanned items from the agent's local database; (11) Ordering Website will add items from the URL to the cart and display the shopping cart screen, but the Website will ignore all the invalid items passed in the URL and add only valid items to the cart at step 220; (12) User will use the Ordering Website to complete the order at step 222.

In accordance with the above, in one alternative method, a product or service identification derived from scanning a bar code symbol may be put (loaded) into the bar code reader, and a customer identifier may similarly be provided in the bar code reader (such as a unique serial number permanently stored in the bar code reader), and the bar code reader may be manually associated with a transaction (user) terminal linked to a computer network by, for example, docking the code reader in a host terminal or through a Bluetooth communication means as known in the art. Both the Ordering Website and the User may be automatically identified by cookies that are resident on the user terminal or computer. Thereafter, potential suppliers on the network who are capable of providing the product or service are determined, and an inquiry may further be transmitted over a network to one or a plurality of sellers to determine the price and availability of the product or service. Also, the sellers can use the customer identity to determine whether and under what terms to complete the sale. Responses are received in the host terminal from one or more sellers including a sales offer; an acceptance is transmitted responsive to one of said sale offers; and a payment is provided to the seller by using a payment identifier transmitted by the transaction terminal. In this way the network is accessed by the bar code reader to facilitate sales transactions.

In other embodiments, a customized scanner is employed which carries an identifier of a particular supplier or distributor of a product or service, e.g. a sponsoring merchant. The sponsoring merchant may itself distribute its bar code readers to customers or potential customers. In this case the bar code reader may be used to facilitate transaction between a customer and the particular supplier to whom an inquiry is transmitted over a computer network to determine the current price and availability of a product or service from the supplier. The customer may receive a response from the supplier over the computer network including a current price and availability. The customer may then transmit an acceptance identifier to the supplier over the computer network as described herein.

In further embodiments, the code reader is integrated with a wireless transceiver unit to facilitate a transaction between a buyer and a seller. For example bar code scanners of the present invention may be integrated into a cellular telephone. In such a case, the need to dock the scanner with a host terminal or home PC to upload or download data may be obviated. The user of such a system may input an order or bid request and directly transmit the order or bid request to a supplier (or may transmit inventory data if the intended application is focused internally). It will be understood that a customer or supplier identifier in the unit may be used for the purposes described above, in order, for example to direct customers to a sponsoring merchant, or to identify the customer to validate use, payment or acceptance.

In implementing the above, the bar code reader of one alternative embodiment has two user actuated keys and possibly a number of audio and visual feedback capabilities. These inputs and outputs are coordinated with at least five basic functions: Scan (e.g., item input), modification of item such as deletion or quantity adjustment, clearing memory, communicating with a host terminal and actuating a lock out. As such, it will understood that the code reader of the above-described embodiments in capable of performing its many functions and provide user feedback without the need of an on board display screen, thus reducing the cost and complexity of the code reader.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for ordering products through the use of a system including bar code readers comprising:

- providing at least one customized mobile bar code reader having associated therewith at least one reader identifier including a customer identity, and also having associated therewith, associated identifiers stored in a memory of said at least one customized mobile bar code reader, including at least a standing inventory compilation and standardized data pertaining to a given product or service;
- using the at least one bar code reader to read an optical code on a given product or service that contains an identifier that relates to said standardized data pertaining to a given product or service description;
- inputting a quantity of said given product or service;
- establishing, thereafter, communication between the at least one customized mobile bar code reader and a terminal linked to the Internet through at least one of the following of a docking station or a wireless connection;
- accessing, through said terminal, a web site of a supplier using supplier identifier indicia obtained from the optical code and associating a reader identifier with the access;
- automatically supplying, to said web site of a supplier, said data relating to said given product, including at least said standardized data pertaining to a given product or service, and said quantity;
- automatically supplying, to said web site of a supplier, data relating to said reader identifier; and
- processing order fulfillment related data received from said supplier based upon access to said web site of said supplier that has been accessed with the reader identifier.

2. The method of claim 1, wherein an Ordering Agent program is loaded onto said terminal, and wherein said Ordering Agent program, will further prompt a user to enter an order web site-specific user ID and password, said web site user ID and password thereafter being stored in a local database on said terminal.

3. The method of claim 2, wherein said Ordering Agent will periodically retrieve items pertaining to an order, including a web site-specific user ID, and will call a web service running on the said web site of a supplier, and will effectuate said order through conversion of said web site-specific user ID and said password to arguments which are passed to said web service.

4. The method of claim 3, wherein said Ordering Agent will receive a validation response from said web service running on the said web site of a supplier, and where validation has been indicated by said validation response, then said Ordering Agent will receive said fulfillment related data and will create at least item codes, descriptions and barcode data on said local database on said terminal.

5. The method of claim 4, wherein when said bar code reader establishes a connection with said terminal, said Ordering Agent will transfer said fulfillment related data and any item codes, descriptions and barcode data stored on said local database on said terminal to said bar code reader either manually or automatically.

6. The method of claim 5, wherein when said bar code reader reads said optical code on a given product that contains an identifier that conveys standardized product description, a user will read said product description and will confirm or modify an order.

7. The method of claim 6, wherein said Ordering Agent will further load said data relating to said given product, including at least said standardized product description and said quantity and will store said data relating to said given product, including at least said standardized product description and said quantity in said local database on said terminal.

8. The method of claim 7, wherein said Ordering Agent will further launch said web site of said supplier in such a way as to utilize a new browser window and so as to provide said web site of said supplier data relating to said user ID, said password, said item codes, and said quantity in a URL so as to be input to a shopping cart screen.

* * * * *